United States Patent
Makovets

(10) Patent No.: US 9,128,253 B2
(45) Date of Patent: Sep. 8, 2015

(54) ROTARY OPTICAL CABLE CONNECTOR

(75) Inventor: Georgy Konstantinovich Makovets, Moscow (RU)

(73) Assignees: Federal State Budgetary Institution <<Federal Agency for Legal Protection of Military, Special and Dual Use Intellectual Activity Results>> (FSBI <<FALPIAR>>), Moscow (RU); JOINT STOCK COMPANY <<Center VOSPI>>, Moscow (RU)

( * ) Notice: Subject to any disclaimer, the term of this patent is extended or adjusted under 35 U.S.C. 154(b) by 140 days.

(21) Appl. No.: 14/127,901

(22) PCT Filed: Jun. 22, 2012

(86) PCT No.: PCT/RU2012/000491
§ 371 (c)(1),
(2), (4) Date: Dec. 19, 2013

(87) PCT Pub. No.: WO2012/177185
PCT Pub. Date: Dec. 27, 2012

(65) Prior Publication Data
US 2014/0126860 A1  May 8, 2014

(30) Foreign Application Priority Data

Jun. 23, 2011 (RU) .................. 2011125631

(51) Int. Cl.
*G02B 6/36* (2006.01)
*G02B 6/34* (2006.01)

(52) U.S. Cl.
CPC .................. *G02B 6/3604* (2013.01)

(58) Field of Classification Search
CPC ..................................................... G02B 6/3604
See application file for complete search history.

(56) References Cited

U.S. PATENT DOCUMENTS

| | | | | |
|---|---|---|---|---|
| 5,372,625 A * | 12/1994 | Brehm et al. | .................... | 65/409 |
| 5,442,721 A * | 8/1995 | Ames | ............................ | 385/26 |
| 5,633,963 A | 5/1997 | Rickenbach et al. | | |
| 6,499,886 B1 * | 12/2002 | Mizuno et al. | .................. | 385/70 |
| 7,373,041 B2 * | 5/2008 | Popp | ............................... | 385/26 |
| 2007/0019908 A1 * | 1/2007 | O'Brien et al. | ................. | 385/36 |
| 2011/0013913 A1 * | 1/2011 | Kuo et al. | ..................... | 398/131 |

FOREIGN PATENT DOCUMENTS

| | | |
|---|---|---|
| CA | 2487535 A1 | 12/2003 |
| RU | 86020 U1 | 8/2009 |
| RU | 2009113708 A | 10/2010 |
| WO | WO 2012177184 A1 * | 12/2012 |

* cited by examiner

*Primary Examiner* — Michelle R Connelly
(74) *Attorney, Agent, or Firm* — Andrew W. Chu; Craft Chu PLLC

(57) ABSTRACT

The rotary connector is intended for use in the field of fiber optic communication and information transfer. The rotary optical cable connector includes a housing, in which two units with guide sleeves are arranged opposite one another, each having the ends of optical cables fastened therein. One of the units is able to rotate, and the other is fixed. A prism is situated between the guide sleeves, and retainers in the form of rods with a cruciform cross-section are secured in the sleeves. The optical cables are disposed in the recesses in the aforesaid retainers and the ends of the cables line up with gradient-index lenses. The rotary connector transmits four rotating light beams with minimal loss.

2 Claims, 4 Drawing Sheets

ROTARY OPTICAL CABLE CONNECTOR

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The rotary connector is intended for use in the communications field for the purpose of transmitting information over fiber-optic cables.

2. Description of Related Art Including Information Disclosed Under 37 CFR 1.97 and 37 CFR 1.98

A connector for optic cables is known (RU Patent No. 2402794, publ. 27 Oct. 2010) that comprises a housing where two assemblies are arranged oppositely, each having ends of optical cables fixed therein, one of the assemblies is rotatable, and the other assembly is fixed rigidly, the housing comprises a ferrule, and the housing is made as a sleeve, the rotatable assembly is arranged on one end of the housing and consists of a shaft with a stepped axial opening in which an optical cable, bearings and a spacing sleeve are arranged, the rigidly fixed assembly is installed on the other end of the housing and consists of a sleeve with a cable fixed therein, the sleeve being aligned with a ferrule provided with a lateral cutout in which cleared ends of cables are arranged, and the ferrule itself is filled with a silicon gel. The lateral cutout in the ferrule is covered with a boot.

A disadvantage of this connector is its limited field of application—only for connecting two optical cables.

A rotatable connector for optical cables is known that is made of two interconnected parts within which a hollow shaft is arranged that has spring-loaded ferrules positioned therein, an optical cable being arranged in each of the ferrules (U.S. Pat. No. 5,633,963, publ. 27 May 1997). This connector may not be used for connecting several optical fibers and, moreover, exhibits losses of light flux.

SUMMARY OF THE INVENTION

The technical effect of this invention is creation of a rotary connector for connecting more than two optic fibers with reduced losses of light flux.

The said technical effect is achieved due to the fact that the inventive rotary connector for optical cables is made as a housing in which two assemblies are arranged opposite to each other, each of them having ends of optical cables fixed therein, and one of the assemblies is rotatable and the other assembly is fixed rigidly; a prism is arranged between guide sleeves, and ferrules in the form of rods having cruciform cross-section are fixed in the said sleeves, optical cables are arranged in slots made in the said ferrules, and ends of the said cables are brought to focons.

BRIEF DESCRIPTION OF THE DRAWINGS

The utility model is further explained with reference to the accompanying drawings.

DETAILED DESCRIPTION OF THE DRAWINGS

Figure 1:
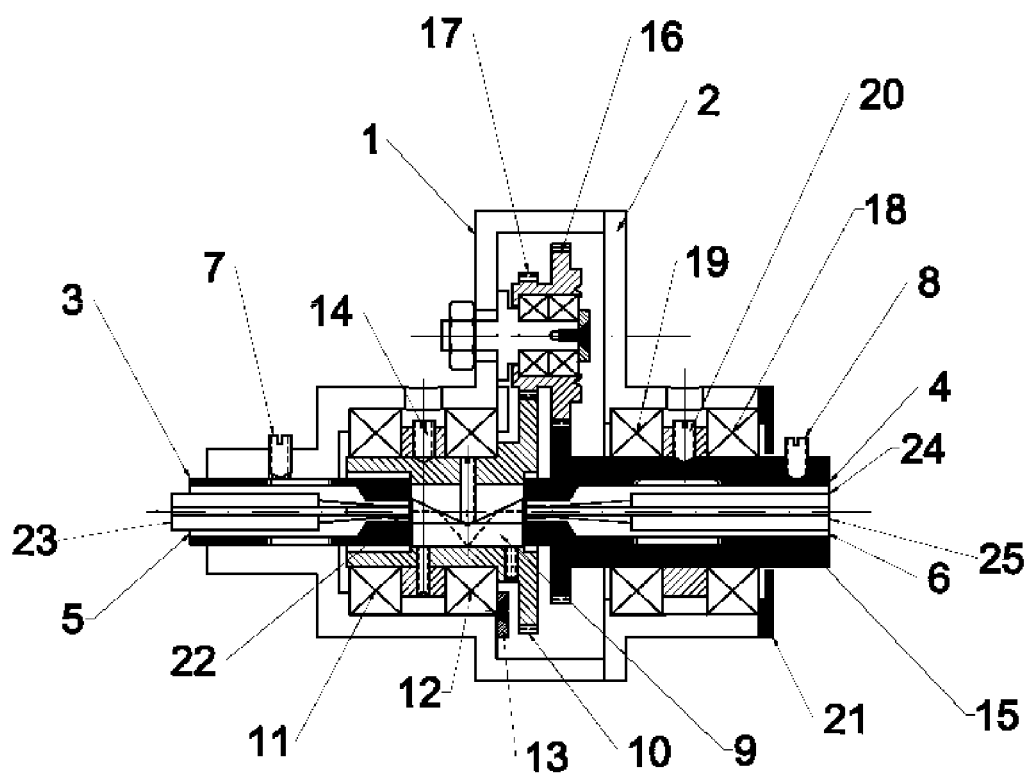
FIG. 1 shows the cross sectional view of the rotary optical cable connector.
Figure 2:
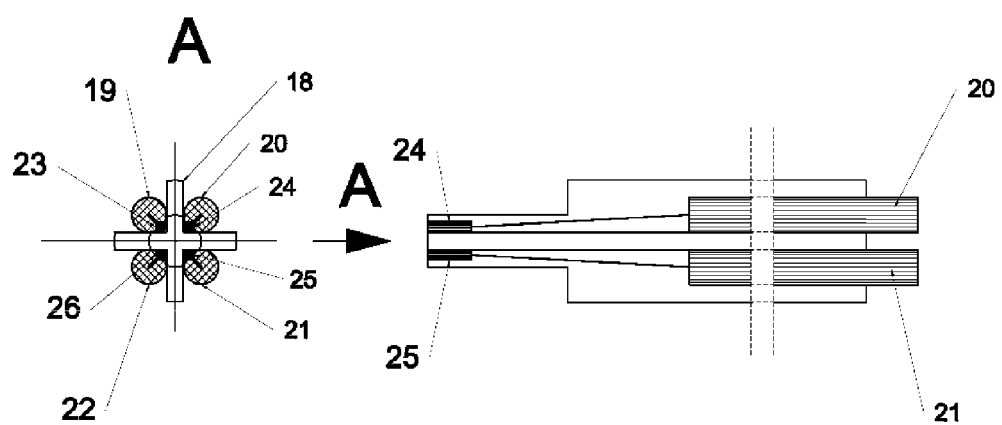
FIG. 2 shows the cruciform-section rods which slots have optical cables glued therein in end and side elevation views.
Figure 3:
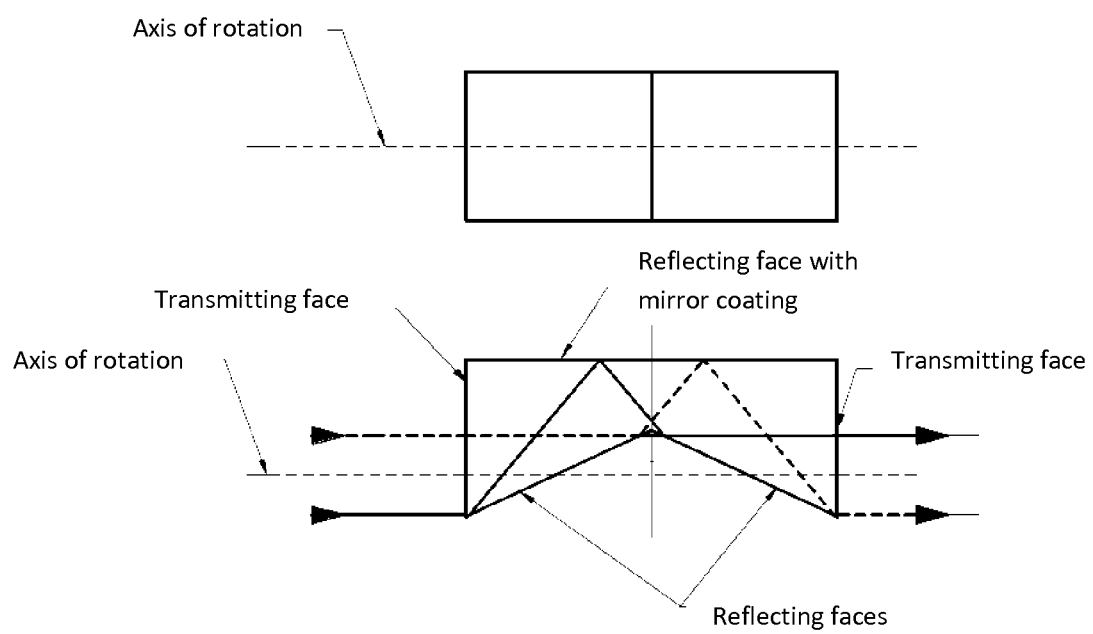
FIG. 3 shows the schematic illustration of the path of light flux in the prism.

The rotary optical cable connector (FIG. 1) comprises a housing 1 with a cap 2, in which guide sleeves 3 and 4 are arranged. The sleeve 3 is fixed in the housing 1 with a screw 7, and the sleeve 4 is fixed in the shank of a gear 15 by a screw 8. The gear 15 is able to rotate in bearings 18 and 19. An optical element 9, which is made as a pentagonal concave prism, is arranged between the guide sleeves 3 and 4. The prism 9 is secured to the inner surface of a hole made in the shank of a gear 10 arranged on the bearings 11 and 12 in the housing 1. The axes of rotation of the gears 10 and 15 as well as the axis of rotation of the prism 9 coincide with the axes of the guide sleeve 3 fixed in the housing 1 and the rotatable guide sleeve 4. The gears 10, 15 and a double gear 16 and 17 provide rotation transfer 2/1 when rotating. Thus, when the rotatable guide sleeve 4 rotates, the prism 9 rotates with a speed equal to half-speed (½) of the sleeve 4. Ferrules 5 and 6 are fixed in the sleeves 3 and 4 and represent rods 18 having a cruciform section (FIG. 2). Optical cables 19, 20, 21, 22 are glued into slots and their ends are brought to grins 23, 24, 25, 26. The alignment of a fiber end with a grin ensures that light fluxes pass from the group of four grins of the ferrule 5 to the group of grins of the ferrule 6, respectively. During operation of the optical connector the rotation of the group of light guides of the ferrule 6 is compensated by a 90-degree turn of the prism. The prism has two faces of total internal reflection and one face with a reflecting mirror coating. A light flux enters the prism normally to the surface, which enables to introduce it via an immersion medium, thus reducing optical losses. The path of a light flux in the rotating prism is shown in FIG. 3. The rotation axis of the prism is indicated in FIG. 3 as "a".

Figure 4:
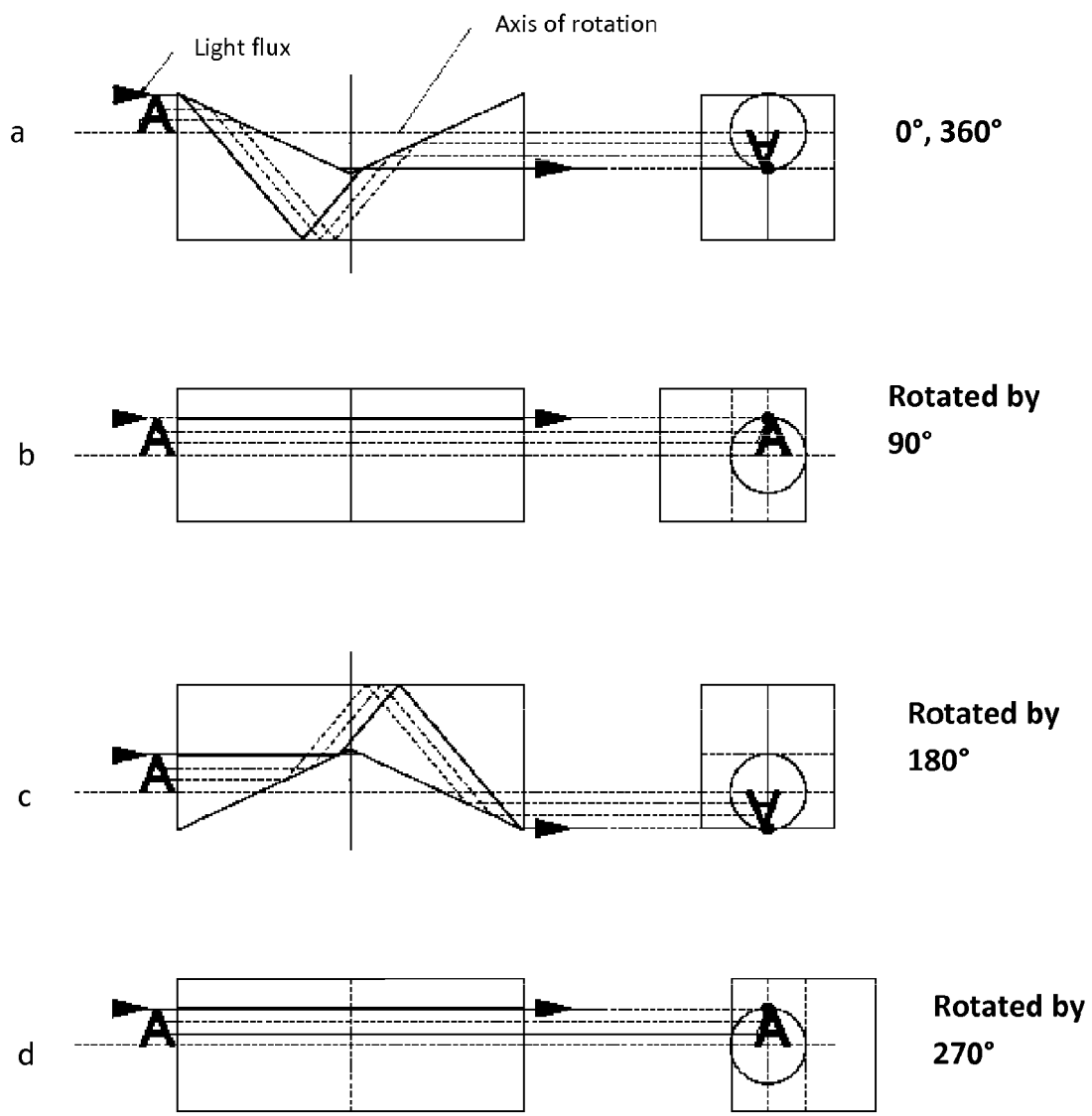
FIG. 4 shows the schematic illustration of the prism positioning after its successive turns by 90°.

The positions of the prism 9 are shown in FIG. 4, where positions a, b, c, d differ from each other by its successive turns by 90°. At each turn by 90° an outgoing light flux becomes turned by 180°. Therefore, the prism should be rotated by an angle that is twice as less as an rotation angle of the rotatable ferrule (6). In this case light fluxes going out of the prism will follow the rotatable ferrule, thus ensuring continuous optical connection. In such a way, the device transmits a rotating light flux with the use of four cables. Losses of a light flux are reduces due to the fact that it enters the optical element at a right angle.

I claim:

1. A rotary connector for optical cables, comprising:
   a housing having two assemblies with guide sleeves arranged opposite to each other, each of said sleeves having optical cables fixed therein, wherein one of the assemblies is rotatable and another assembly is fixed rigidly;
   an optical element being situated between the guide sleeves and being comprised of a rotating pentagonal concave prism, having an axis of rotation coinciding with axes of the guide sleeves, the concave prism having two faces of total internal reflection and one face with a reflecting mirror coating;

a light flux entering normal to a surface of said rotating pentagonal concave prism via an immersion medium; and ferrules being comprised of rods having a cruciform cross-section fixed in the sleeves, said ferrules having slots housing the optical cables arranged with ends thereof brought to grins.

2. A rotary connector for optical cables according to claim 1, wherein said rotating pentagonal concave prism is secured to an inner surface of a hole disposed in a shank of a gear arranged on bearings in said housing, an axis of rotation of said gear coinciding with axes of the guide sleeves.

\* \* \* \* \*